United States Patent [19]

Frank

[11] 4,252,552
[45] Feb. 24, 1981

[54] SHAPING GLASS SHEETS USING MOLDS OF DIFFERENT SHAPES

[75] Inventor: Robert G. Frank, Murrysville, Pa.

[73] Assignee: PPG Industries, Inc., Pittsburgh, Pa.

[21] Appl. No.: 78,626

[22] Filed: Sep. 25, 1979

[51] Int. Cl.³ .......................................... C03B 23/023
[52] U.S. Cl. ....................................... 65/106; 65/107; 65/273; 65/268; 65/287
[58] Field of Search ................. 65/106, 107, 268, 273, 65/285, 287

[56] References Cited

U.S. PATENT DOCUMENTS

| | | | |
|---|---|---|---|
| 1,889,881 | 12/1932 | Thompson | 65/106 |
| 2,817,928 | 12/1957 | Lambert et al. | 65/106 |
| 3,508,903 | 4/1970 | Seymour | 65/273 |
| 3,573,889 | 4/1971 | McMaster et al. | 65/106 X |
| 3,607,187 | 9/1971 | McMaster | 65/273 X |
| 3,846,106 | 11/1974 | Seymour | 65/104 X |
| 4,092,141 | 5/1978 | Frank et al. | 65/273 X |
| 4,185,986 | 1/1980 | Frank | 65/287 |
| 4,202,681 | 5/1980 | McMaster et al. | 65/104 |
| 4,204,854 | 5/1980 | McMaster | 65/106 |

FOREIGN PATENT DOCUMENTS 766145 4/1970 Belgium ..................................... 65/106
1337199 11/1973 United Kingdom .

Primary Examiner—Arthur D. Kellogg
Attorney, Agent, or Firm—Donald C. Lepiane; Edward I. Mates

[57] ABSTRACT

Shaping glass sheets by lifting a heat-softened glass sheet on a lower mold having an upwardly facing surface defining a given sharpness of bend and transferring said glass sheet by suction to an upper vacuum mold having a downwardly facing shaping surface defining a lesser sharpness of bend. Optionally, a ring-like member defining a sharpness of bend that may be equal to, less severe, or more severe than that defined by the upper vacuum mold moves between the molds when the latter are separated to impose a shape in the glass sheet that is correlated with the shape defined by the ring-like member. The ring-like member is used to support the glass sheet for rapid cooling if the glass sheet is to be tempered. Only the ring-like member need be changed when a change in production pattern is made.

21 Claims, 15 Drawing Figures

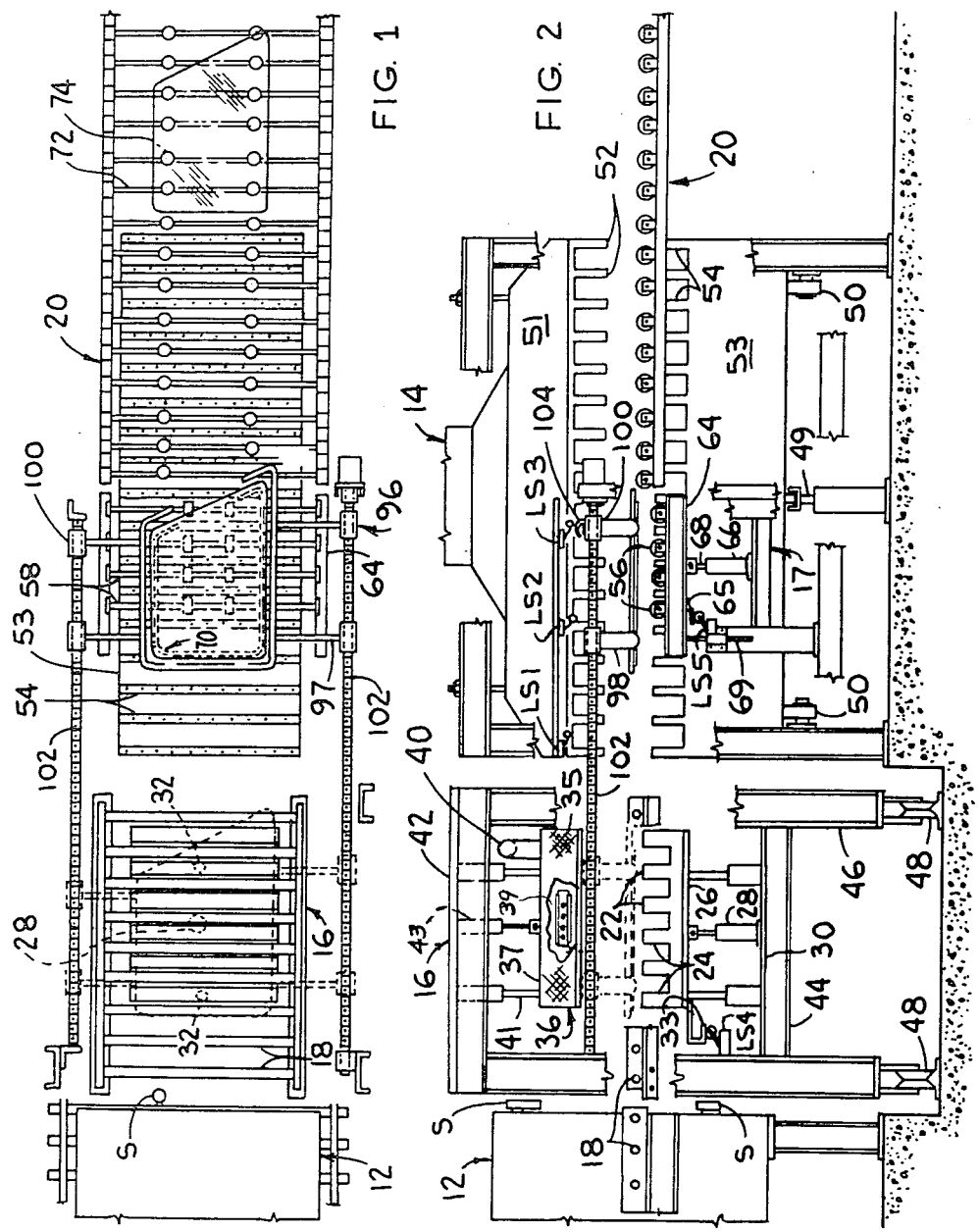

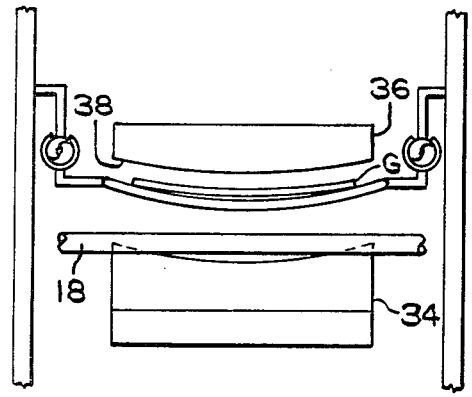
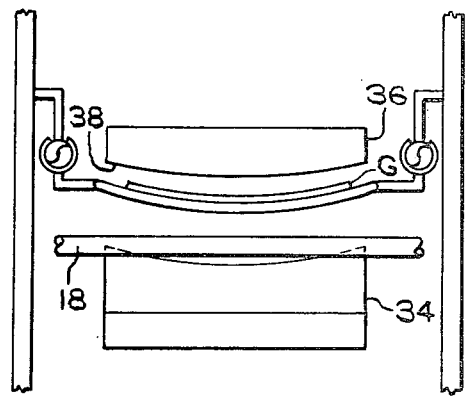
Fig.10  Fig.11
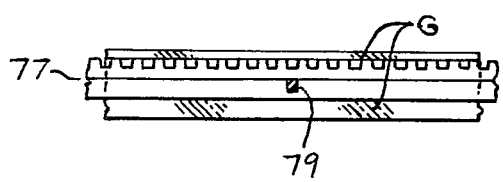
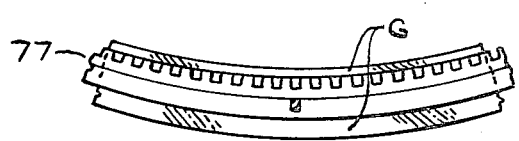
Fig.12  Fig.13
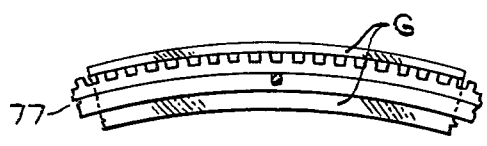
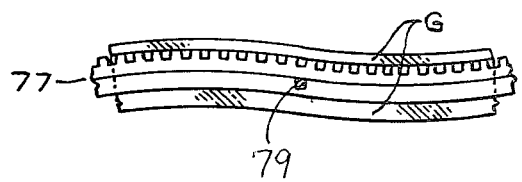
Fig.14  Fig.15

SHAPING GLASS SHEETS USING MOLDS OF DIFFERENT SHAPES

BACKGROUND OF THE INVENTION

1. Field of the Invention

This invention relates to shaping and cooling glass sheets and particularly to the high speed production of bent glass sheets that are toughened by air quenching, and most particularly, for shaping and heat treating relatively thin glass sheets.

Shaped glass sheets are widely used as side windows in vehicles such as automobiles or the like and, to be suitable for such application, flat glass sheets must be shaped to precisely defined curvatures dictated by the shape and outline of the frames defining the window openings into which the glass side windows are installed. It is also important that the side windows meet stringent optical requirements and that the windows be free of optical defects that would tend to interfere with the clear viewing therethrough in their viewing area. During fabrication, glass sheets intended for use as shaped windows in vehicles are subjected to thermal treatment to temper the glass for strengthening the same and increasing the resistance of the shaped window the damage resulting from impact. In addition to increasing the resistance of a glass sheet to breakage, tempering also causes a glass sheet to fracture into relatively small, relatively smoothly surfaced fragments that are less injurious than the relatively large, jagged fragments that result from the more frequent breakage of untempered glass.

The commercial production of shaped glass sheets for such purposes commonly includes heating flat sheets to the softening point of the glass, shaping the heated sheets to a desired curvature and then cooling the bent sheets in a controlled manner to a temperature below the annealing range of the glass. During such treatment, a glass sheet is conveyed along a substantially horizontal path that extends through a tunnel-type furnace where the glass sheet is one of a series of sheets that are heated to the deformation temperature of glass and into a shaping station where each glass sheet in turn is transferred onto a lifting member that lifts the glass sheet into engagement with a vacuum mold. The vacuum mold holds the shaped glass by suction while the lifting member retracts to below the substantially horizontal path. At about the same time, a transfer and tempering ring having an outline shape conforming to that of the glass sheet slightly inboard of its perimeter moves upstream into a position below the vacuum mold and above the lifting member. Release of the vacuum deposits the shaped glass sheet onto the tempering ring.

In prior art apparatus, the lifting member, the vacuum mold and the transfer and tempering ring had shaping surfaces whose curvature conformed to one another. Hence, when production required a change of production pattern from sheets of one elevational shape and one outline configuration to sheets of a different elevational shape and/or a different outline configuration, it was believed necessary to remove and replace all three glass sheet engaging members, namely, the lifting member, the vacuum mold and the transfer ring.

2. The Prior Art

U.S. Pat. No. 1,889,881 to Ralph C. Thompson shapes a soft, horizontally disposed glass sheet between an upper mold and a lower mold of complementary shape. A portion of the lower mold within its outline marginal portion is recessed below the surface of the outline marginal portion to avoid simultaneous engagement of the opposite glass sheet surfaces in the vision area of the glass sheet. The soft glass sheet is simultaneously engaged at its opposite surfaces in the marginal portion only and sags within the limits of the recessed lower mold portion inside the marginal portion.

U.S. Pat. No. 3,508,903 to Samuel L. Seymour press bends tong gripped glass sheets between molds having shaping surfaces of slightly different radii of curvature to avoid simultaneous engagement of the viewing area between the molds. Such an arrangement does not avoid tong marks in the bent glass.

U.S. Pat. No. 3,607,187 to Harold A. McMaster lifts a soft, flat glass sheet by suction against a downward facing shaping surface of a vacuum mold to shape the sheet by suction thereagainst. Much power is needed to provide the suction necessary to shape the entire flat glass sheet to conform to the shape of the vacuum mold in incremental portions, particularly those portions most widely spaced from the vacuum mold when other portions are initially engaged by the vacuum mold.

U.S. Pat. No. 3,846,104 to Samuel L. Seymour provides method and apparatus in which glass sheets are conveyed through a furnace on conveyor means, and heated while passing through the furnace to a temperature approaching the glass softening point. At a shaping station beyond the furnace, each glass sheet in turn is lifted by a lower outline shaping mold which raises the glass sheet into engagement with an upper vacuum mold having a shape conforming to that desired for the glass. The upper vacuum mold remains at the shaping station and holds the shaped glass thereagainst as the lower shaping mold retracts to below the level of the conveyor means. A tempering ring shaped to support the bent glass sheet adjacent its marginal or peripheral edge only, moves generally horizontally between the shaping station and a cooling station to receive each shaped glass sheet released by the vacuum mold and transfer it to the cooling station. The outline shapes of the lower outline shaping mold and of the tempering ring conform to the shape of the downward facing shaping surface of the upper vacuum mold. The molds and the ring were believed to require replacement whenever a production pattern was changed.

U.S. Pat. No. 4,092,141 to Robert G. Frank and DeWitt W. Lampman provides similar apparatus by providing vertically movable sheet transfer means for rapidly removing from the tempering ring each bent glass sheet after the latter has had its surfaces hardened sufficiently to permit it to be conveyed on an additional downstream conveyor providing a glass sheet supporting surface at an elevation slightly higher than the level of which the glass is supported by the transfer and tempering ring. However, the apparatus of this patent also requires that the lifting mold, the upper vacuum mold and the transfer and tempering ring define the same shape and that all be replaced to accommodate for a different production pattern.

The prior art patents fail to provide a shaping operation that permits a single lower shaping mold and a single upper vacuum mold to be installed permanently to provide means to produce a plurality of shapes of different outline patterns and of different curvatures. It would be desirable to reduce the number of parts of glass sheet shaping apparatus that must be changed when production requires a change in pattern from one part having a different severity of bend from that of the previous production part.

SUMMARY OF THE INVENTION

The present invention provides shaping apparatus that helps to produce glass sheets of different outlines and different curvatures using a common lower shaping mold and a common upper vacuum mold in combination with a relatively readily replaceable ring-like member having an outline shaping surface that conforms to the shape desired for the glass sheet both in elevation and in plan outline.

The apparatus aspect of the present invention comprises the subcombination of a lower mold having an upwardly facing shaping surface defining a shape having a given sharpness of bend and an upper vacuum mold having a downwardly facing shaping surface defining a shape having a bend component of slightly more shallow curvature. Means is provided to vary the distance between the upper and lower molds to bring the glass sheet close enough to the upper mold to enable the latter to engage the glass sheet by suction. Means is provided to increase the space between the molds to permit the entry of a ring-like member therebetween. The ring-like member combines with the subcombination to provide a specific embodiment of apparatus and defines a shape that may be the same or different from that of the downwardly facing shaping surface of the upper vacuum shaping mold.

According to the present invention, in its broadest terms, a heat-softened glass sheet at the shaping station is engaged at its lower surface with a lower mold having an upward facing shaping surface defining a bend component having a given sharpness of curvature. The soft glass sheet sags by gravity toward the upward facing shaping surface of the lower mold. The upper vacuum mold provided above the lower mold engages the marginal portion only of the glass sheet initially, and then increases its area of engagement as suction continues to change the shape of the heat-softened glass sheet to that of the downwardly facing shaping surface of the upper vacuum mold. If no further shaping is required for the glass sheet, it may be released from the vaccum mold.

However, glass sheets shaped in the manner described are usually heat-strengthened or tempered to improve their strength and are usually supported on a ring-like member adjacent their periphery while the shaped glass sheet is cooled by playing tempering medium (most frequently, blasts of cold air) that chill the opposite surfaces of the shaped glass sheet rapidly enough to establish a stress pattern throughout the glass sheet thickness that characterizes heat-strengthened or tempered glass. When the ultimate shape desired for the glass sheet is that of the downwardly facing shaping surface of the upper vacuum mold, the ring-like member has an upwardly facing outline shaping surface that conforms to that of the downwardly facing shaping surface of the upper vacuum shaping mold.

However, when a given combination of lower mold and upper vacuum mold of slightly different configurations is provided at a glass sheet shaping apparatus and the glass part to be produced requires a shape different from that defined by the downwardly facing shaping surface of the upper vacuum mold, according to the present invention, it is possible to produce a wide variety of bends without changing the lower mold or the upper vacuum mold. All that is needed is to replace the ring-like member whose upper shaping surface correlates with the previous production part with one whose upper shaping surface correlates with the next succeeding production part.

In a specific embodiment of this invention, the lower mold is provided with an upper shaping surface of cylindrical configuration about a given axis of bending having a given radius of curvature, the upper vacuum mold has a downwardly facing shaping surface of cylindrical configuration about an axis parallel to said given axis and having a larger radius of curvature. The ring-like member has a shaping rail that includes a transverse rail portion defining a cylindrical bend about an axis parallel to said given axis whose radius of curvature may be within a large range of radii. If the ultimate bend desired is cylindrical, the ring-like member has a pair of longitudinal shaping rail portions that extend in the general direction of said given axis with straight upper shaping surfaces. For shaping a glass sheet to a compound bend, the latter pair of shaping rail portions have upper shaping surfaces that are shaped in elevation to conform to the shape desired for the glass sheet transverse to its first component of bend, which may be cylindrical or any other desired configuration.

Apparatus conforming to the present invention has been used to produce shaped glass sheets having different outlines and shapes having radii of curvature ranging from 43 inches (109 cm) to 60 inches (152 cm) without changing the lower mold or the upper vacuum mold of the glass sheet shaping apparatus. Such production has been performed using a permanently installed lower mold whose upwardly facing shaping surface defines a shape having a radius of curvature of 48 inches (122 cm), a permanently installed upper vacuum mold whose downwardly facing shaping surface defines a shape having a radius of curvature of 50 inches (127 cm) and replaceable ring-like members defining different degrees of curvature within the limits desired.

The present invention will be better understood in the light of a description of an illustrative embodiment that follows, which description includes the accompanying drawings wherein like reference numbers refer to like structural elements.

BRIEF DESCRIPTION OF THE DRAWINGS

FIG. 1 is a fragmentary, plan view of apparatus for shaping and tempering glass sheets incorporating a preferred embodiment of the present invention, with certain parts omitted for clarity;

FIG. 2 is a fragmentary, longitudinal view of the embodiment of FIG. 1 with certain parts omitted or broken away or shown in inconsistent positions to show other parts of the apparatus more clearly and with certain positions depicted in phantom consistent with FIG. 1;

FIG. 10 is a view similar to that of FIG. 8, showing a glass sheet at the moment it is deposited onto a ring-like member whose upper shaping surface defines a shape having a smaller radius of curvature than that of the downwardly facing shaping surface of the vacuum mold;

FIG. 11 is a view similar to FIG. 9 showing how the ring-like member supports the shaped glass sheet after a brief interval of support thereon;

FIG. 12 is an elevational view of a portion of a longitudinal side rail portion of a ring-like member having a transverse rail portion of cylindrical concave elevation wherein the longitudinal side rail portion has a straight upper edge for supporting a glass sheet shaped to a cylindrical shape;

FIG. 13 is a view similar to that of FIG. 12 of a longitudinal rail portion of another embodiment, showing how the longitudinal rail portion of the ring-like member of this embodiment has its upper edge shaped longitudinally in concave elevation to help produce a compound bend of concave elevation about two axes of bending in a glass sheet;

FIG. 14 is a view similar to that of FIGS. 12 and 13 of a longitudinal rail portion and another embodiment, showing how the longitudinal rail portion of the ring-like member of this embodiment has its upper edge shaped longitudinally in convex elevation to help the ring-like member produce a complicated shape in the glass sheet that comprises a cylindrical bend of concave elevation conforming to the transverse rail portion about one axis of bending and a convexly shaped elevational curve conforming to the longitudinal side rail portion about another axis of bending; and FIG. 15 is a view similar to FIGS. 12, 13 and 14 of a longitudinal rail portion of still another embodiment, showing how the longitudinal rail portion of this embodiment is shaped with both convex and concave elevational portions to help shape a glass sheet into a complicated curvature that includes a cylindrical shape of concave elevation conforming to the upper edge of the transverse rail portion about one axis and a complicated bend comprising convexly and concavely curved portions conforming to the upper edge of the longitudinal rail portion.

DESCRIPTION OF THE PREFERRED EMBODIMENT

Figure 3:
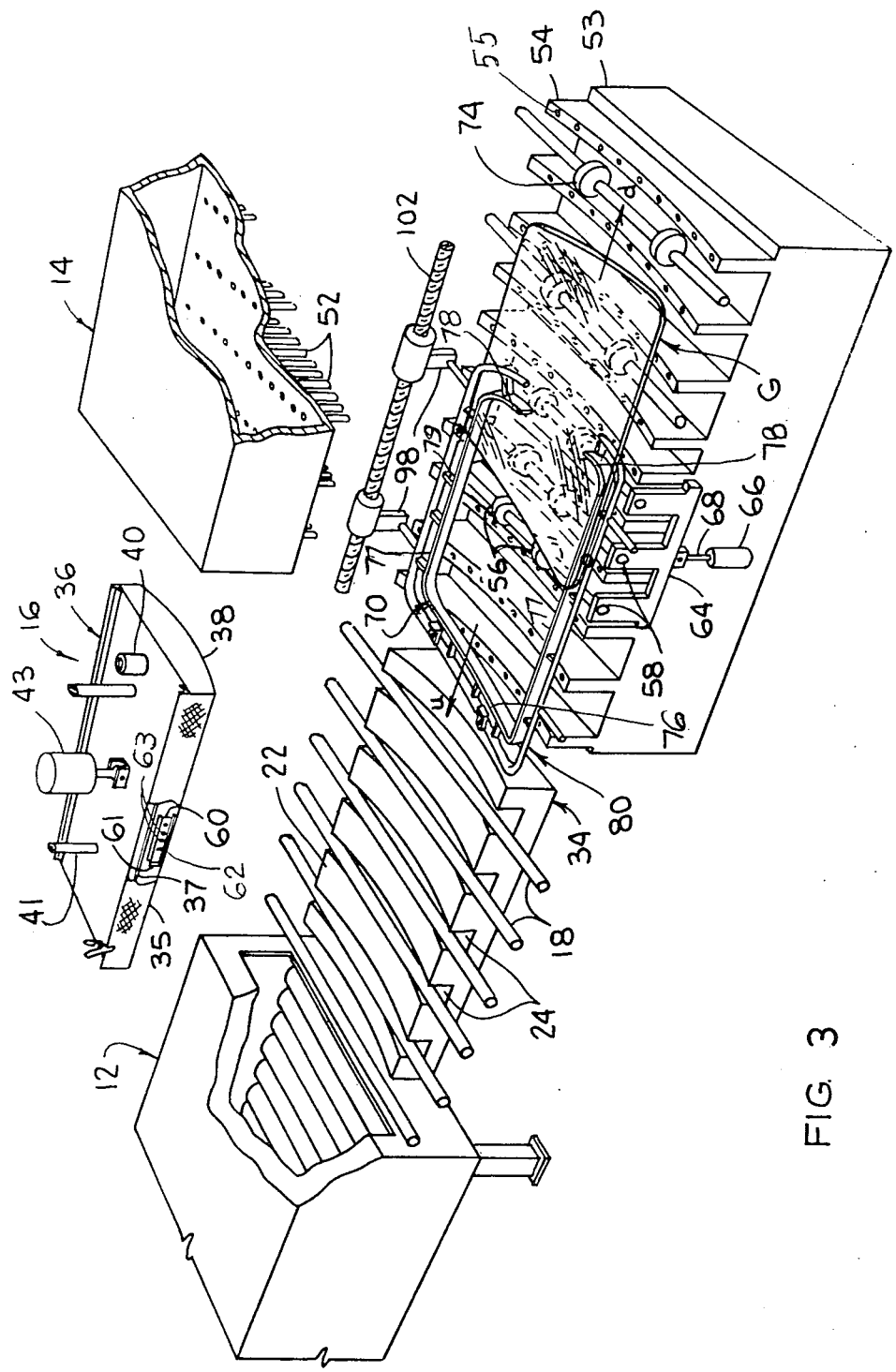
FIG. 3 is a schematic perspective view of a portion of the apparatus of FIGS. 1 and 2 with parts omitted to show a simplified structure of a shaping station included in the preferred embodiment.
Figure 4:
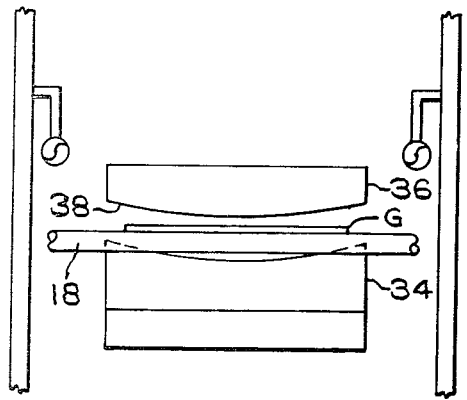
FIG. 4 is a cross-sectional, schematic view taken across the shaping station showing a flat, hot glass sheet entering the shaping station with the upper vacuum mold and the lower mold separated from one another.

Referring now to FIGS. 1 and 2 of the drawings, an apparatus for heating and shaping sheets of material, such as glass, includes a heating means including a furnace 12 through which sheets of glass are conveyed from a loading station (not shown) while being heated to the glass deformation temperature. A cooling station generally indicated at 14 for cooling the curved sheets of glass and an unloading station (not shown) beyond the cooling station 14 are located in end-to-end relation to the right of the furnace 12. An intermediate or shaping station 16 is disposed between the furnace 12 and the cooling station 14. A sheet transfer means 17 located in the cooling station 14 transfers the shaped and tempered glass sheet to a downstream conveyor 20 for transport to the unloading station.

Heat may be supplied in the furnace 12 by hot gases from gas burners or by electrical radiant heaters or by a combination of both, which heat supply means are well known in the art. The heating means includes a horizontal conveyor comprising longitudinally spaced, transversely extending conveyor rolls 18 that define a path of travel which extends through the furnace 12 and the shaping station 16. The rolls of the conveyor are arranged in sections and their rotational speed controlled through clutches (not shown) so that the speed of the different conveyor sections may be controlled and synchronized in a manner well known in the art. A glass sensing element S is located beyond the exit of furnace 12 to initiate a cycle of operation of this apparatus.

Limit switches LS-1 through LS-5 are provided to synchronize the operation of various elements of the apparatus according to a predetermined sequence. The glass sensing element S, the limit switches LS-1 through LS-5 and various timer circuits actuated thereby cooperate to provide synchronizing means for the apparatus of the present specification.

Figure 5:
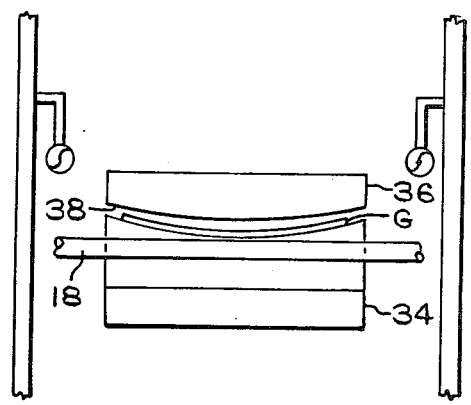
FIG. 5 is a view similar to FIG. 4 taken immediately thereafter, showing how the hot glass sheet is engaged by the upper shaping surface of the lower mold to shape the glass sheet.

The shaping station 16 comprises a lower mold 34 and an upper vacuum mold 36. The latter is composed of metal covered with a refractory material such as fiber glass 35, as is well known in the art. The former comprises an upper surface 22 (FIG. 3) conforming in elevation shape to a first shape desired for a glass sheet to be bent. The upper surface 22 is interrupted intermittently by transversely extending grooves 24 which provide clearance for raising and lowering the lower mold 34 between a recessed position below the conveyor rolls 18, as depicted in FIGS. 3, 4 and 8 to 11, and an upper position above the level of said conveyor rolls, as depicted in FIG. 5. The lower mold 34 is fixed to a lower mold support 26 and is limited in its upward movement toward the upper vacuum mold 36 to a closest spacing therebetween slightly greater than the glass sheet thickness, preferably no less than twice the glass sheet thickness.

Since automobile side windows have a fairly constant radius of curvature about a horizontal axis in order to facilitate their raising and lowering in an automobile body between an open and closed position, many different patterns in a family of patterns have different outline shapes but are bent to the same radius of curvature. Therefore, it is desirable to have one lower mold capable of producing each family of patterns. It has been found that a lower shaping mold of a given radius of curvature having longer dimensions than a family of side windows of said given radius of curvature but of different outline shapes and/or different dimensions can fabricate curved side windows of said family of different sizes but of said given radius of curvature. In the apparatus of this specification, one lower shaping mold can be installed in conjunction with an upper vacuum mold of slightly different curvature to produce any pattern of a family of patterns having a given radius of curvature but of different sizes and/or outline shapes without requiring any removal or replacement of the lower mold and/or of the upper vacuum mold.

The upper surface 22 of the lower mold 34 is preferably smoothly surfaced to avoid imparting any irregularity in the supported glass sheet surface, is composed of a material that does not react with glass, is easily shaped to the smoothly surfaced contour desired and has good durability despite intermittent contact with hot glass that causes rapid cyclical temperature variations over an extended period. A good material for the grooved lower shaping mold 34 is an alumino-silica cement sold by Johns-Manville under the trademark of TRANSITE.

Raising and lowering means in the form of a piston 28 rigidly mounted to a piston support platform 30 raises and lowers support 26 and its attached lower shaping mold 34 a limited distance. Alignment posts 32 are attached to mold support 26 to assure vertical movement of the lower mold 34. A lug 33 is connected to mold 34 to actuate limit switch LS-4.

The upper vacuum mold 36 has an upper mounting plate 37 and a lower wall 38 that is apertured, as well as side walls 39, at least one of the latter being apertured. The lower wall 38 is shaped to be less sharply bent than the shaping surface formed by the upper surface 22 of the lower mold 34. The upper vacuum mold 36 communicates with a source of vacuum (not shown) through an evacuation pipe 40 and a suitable valve (not shown). The upper vacuum mold 36 is suitably connected through upper vertical guide rods 41 to an upper supporting frame 42 and movable relatively thereto by an upper vertical piston 43. The evacuation pipe 40 may be connected through a suitable valve arrangement to a source of pressurized air (not shown) and the valves for the vacuum line and for the pressure line may be synchronized according to a predetermined time cycle in a manner well known in the art.

Any portion of a side wall 39 of the upper vacuum shaping mold 36 that contains apertures is also provided with an apertured slide 60 having a tab 61 at one end thereof. The slide 60 has its longitudinal side portions engaged by a pair of parallel Z-shaped guides 62. The latter are attached along their length to the side wall 39. The tab 61 can move between the Z-shaped guides 62 when the position of the apertured slide 60 is adjusted relative to the apertured side wall 39. The apertured slide 60 has apertures 63 corresponding in size, shape and space therebetween to the arrangement of the apertures in apertured wall 39.

When the apertured slide 60 occupies a position in which its apertures 63 are completely aligned with the apertures in appeared side wall 39, it provides a maximum effective open area for the side wall 39. When the apertured slide 60 occupies a position in which the apertures 63 face the spaces between the apertures in the side wall 39, side wall 39 has no effective open area. It is understood that the slide 60 may be adjusted in any position in which its apertures 63 are partially aligned with apertures in the side wall 39 or in which only one or more of its apertures 63 are partially or completely aligned with one or more apertures in the side wall to provide a desired amount of effective open area in the side wall 39 and means for adjusting the amount of open area as needed.

The reason for providing apertures in at least one of the side walls 39 and an apertured slide 60 therefor is to insure that a glass sheet G drops uniformly onto a ring-like member 70 without tilting from the orientation at which it is engaged against the apertured lower wall 39 of upper vacuum shaping mold 36 when vacuum is released from the latter. When small apertures are uniformly distributed throughout the apertured lower wall 38 and the glass sheets treated have a uniform outline shape, such as an essentially rectangular or circular outline, air under pressure acts uniformly around the perimeter of the glass sheet to cause the latter to drop without tilting onto the ring-like member 70 when vacuum is released in upper vacuum mold 36. However, when a treated glass sheet has an irregular outline, upon releasing the vacuum, air enters the vacuum chamber of the upper vacuum mold 36 through the small apertures in such a manner as to cause a temporary pressure gradient within the upper vacuum mold 36. This pressure gradient produces a non-uniform downward thrust against the upper surface of the glass sheet that was previously supported against the apertured lower wall by vacuum. This non-uniform downward thrust causes the released glass sheet to tilt as it drops toward the ring-like member 70. Providing additional apertures having an effective open area that can be adjusted for the upper vacuum mold provides relatively rapid inflow of air into the upper vacuum shaping mold that masks the effect of the relatively slow flow of air through the relatively small apertures in the apertured bottom wall 38 to cause the glass sheet to tilt as it drops toward the ring-like member 70.

The relative size of the total effective open area due to the positions of the apertures 63 relative to the side wall 39 compared to the total area of the apertures in the apertured bottom wall 38 determines the effectiveness of the apertured slide 60 and apertures in apertured side wall 39 to overcome the tilting tendency. Other factors involved in determining the amount of effective open area of apertures 63 relative to the total area of the apertures of apertured wall 38 that are exposed when the apertured wall 38 engages a glass sheet that is required to insure a non-tilting transfer of the glass sheet from the upper vacuum shaping mold 36 to the ring-like member 70 include the area, thickness and irregularity of outline shape of the glass sheet pattern being treated.

Increasing the effective open area of aligned apertures 63 reduces the chances of tilting the disengaged glass sheet en route to the ring-like member 70 when the vacuum is released on the upper vacuum shaping mold 36 for any particular glass sheet pattern. However, if the effective open area is made too great, suction apparatus consuming a great amount of energy is required. In the interest of energy conservation, the effective open area of the aligned openings is made as small as possible consistent with the open area necessary to insure a glass sheet transfer without tilting.

The apertures in the apertured lower wall 38 are made as small as possible and are spaced as closely as is necessary to assure vacuum support for a hot glass sheet with reasonable energy consumption. For an upper vacuum mold having a glass sheet engaging apertured lower wall 38 with dimensions 46 inches (117 cm) long and 22 inches (56 cm) wide, apertures having a diameter of 0.09 inches (0.23 cm) and spaced apart from one another 1.5 inches (3.8 cm) in a rectangular or diamond pattern have been found to work adequately in handling glass sheets whose weight is up to 20 pounds (9 Kgm). Five apertures, each having a diameter of one inch (25.4 mm) spaced apart on 2.2 inch (56 mm) centers are sufficient for the apertured slide 60 and the corresponding row of apertures in side wall 39.

The shaping station 16 also includes a lower platform 44. Vertical posts 46 interconnect the corners of the upper mold supporting frame 42, the piston support platform 30 and the lower platform 44 to provide a unitary structure. Wheels 48 are mounted on the unitary structure to permit the shaping station 16 to be readily removed from a position of alignment between the exit of the furnace 12 and the entrance to the cooling station 14 and an offset position to facilitate maintenance of the structural elements of the shaping station 16.

The cooling station 14 comprises an upper plenum 51 provided with longitudinally spaced transverse rows of transversely spaced pipe nozzles 52 extending downward to direct air applied under pressure to the upper plenum toward the upper surface of a glass sheet that is aligned with the bottom openings of the nozzles. Opposing the upper plenum 51 is a lower plenum 53 provided with lower bar-type nozzle housings 54 disposed with thick walls extending vertically and having elongated openings 55 directed upward through their thickness so that air applied under pressure to the lower plenum 53 is directed through the elongated openings 55 upward against the lower major surface of the glass sheet. The openings of the lower bar-type nozzle housings oppose corresponding openings in the upper pipe nozzles. The bar-type nozzle housings are spaced vertically below the upper pipe nozzles to provide clearance for moving the ring-like member 70 along a path between said upper nozzles and said lower nozzles. The lower ends of the rows of pipes are located along a curved surface complementary to the curved shape of the upper smooth surfaces of the bar-type housings for the lower nozzles to provide a curved clearance space therebetween conforming to the transverse shape of the glass sheets conveyed therebetween. If desired, the plenums 51 and 53 may be sectionalized along the length of cooling station 14 to provide different air pressures into the various sections of the upper plenum and of the lower plenum so as to provide a program of air blasts along the length of the cooling station 14.

The upper surfaces of the lower bar-type nozzle housings 54 are smoothly surfaced and parallel to one aother to provide discontinuous smooth surfaces on which glass cullet is deposited when a glass sheet fractures in the cooling station 14. The lower bar-type nozzle housings 54 are interconnected by a pivotally mounted frame 50 that pivots about an axis extending longitudinally of the length of the cooling station 14. Frame pivoting means 49 is provided to pivot the frame 50, thereby pivoting the smoothly surfaced lower bar-type nozzle housings 54 into an oblique orientation that permits the glass fragments to slide to one side of the cooling station to clear the cooling station of glass fragments rapidly and efficiently. The lower bar-type nozzle housings 54 are returned to their normal position after the fragments of a prior glass sheet have slid to one side of the cooling station and before the next glass sheet is processed. The means to pivot the lower bar-type nozzles 54 is similar in construction to that disclosed and claimed in U.S. Pat. No. 3,846,106 to Samuel L. Seymour for pivoting a lower set of nozzles, and the description of said pivoting apparatus is incorporated in the present specification by reference.

The spaces between the upper pipe nozzles 52 provide paths for the escape of air blasted against the upper concave surface of glass sheets treated by the apparatus described in this specification. The spaces between adjacent lower bar-type nozzle housings 54 provide paths for the escape of air blasted against the lower convex surface of said glass sheets. While more total space is provided for the escape paths above the glass than for the escape paths below the glass, the difference in total space for escape provided on opposite sides of the shaped glass sheets is helpful in providing greater uniformity of cooling of the top and bottom surfaces than would be the case if both upper and lower glass sheet surfaces had escape paths of equal size. This result follows because a convex surface is more streamlined than a concave surface. Therefore, it is more difficult to remove air applied normally against a concave surface than air applied normally against a convex surface and therefore more escape space is provided to remove air blasts that impinge against the upper concave surface than for air blasts that impinge against the lower convex surface.

The sheet transfer means 17 at the cooling station 14 includes a vertically movable conveyor section comprising a set of doughnut rolls 56 of relatively large diameter mounted on the central portions of thin shafts 58 driven from a gear box and a motor (not shown) mounted on a frame 64. A lug 65 connected to frame 64 actuates limit switch LS-5. Elevator means 66 in the form of one or more pistons is rigidly supported (each with a piston rod 68) on said frame. Vertical guides 69 control movement of the frame 64 in such a manner that when piston rods 68 are extended, the set of doughnut rolls 56 is lifted in unison in a vertical direction into positions where their common upper tangential plane lies in a horizontal plane above the uppermost portion of the shaping surface of the ring-like member 70 to transfer a glass sheet therefrom.

The cooling station 14 also comprises a downstream conveyor 20 comprising additional conveyor shafts 72 downstream of the sheet transfer means 17. Each additional conveyor shaft 72 is provided with a pair of additional doughnut rolls 74 fixed thereto for rotation therewith. The shafts 72 are longitudinally spaced from one another along the length of the downstream conveyor 20 and the additional doughnut rolls 74 are rigidly supported with their common upper tangent occupying a horizontal plane slightly above the uppermost surface of ring-like member 70.

The ring-like member 70 comprises a rail that extends in the form of a ring-like structure disposed edgewise with its width forming the height of the rail. The rail comprises a transversely extending rail portion 76 at the upstream end of the ring-like member, a pair of longitudinally extending rail portions 77 that extend in a downstream direction from the transversely extending rail portion 76 and a pair of inturned downstream end rail portions 78. Connectors 79 are attached at their inner ends to the laterally outer surface of the rail at spaced points therealong and at their outer ends to a reinforcing frame 80. Both the latter and the frame-like member 70 are shaped in outline similar to the outline shape of a supported glass sheet and in elevation similar to the curvature of the supported glass sheet.

The reinforcing frame 80 is preferably constructed of an outer steel pipe similar in outline shape to that of the ring-like member 70 and surrounds the latter in spaced relation thereto. The space between the ring-like member 70 and the reinforcing frame 80 is determined by the length of the connector means 79. Both the ring-like member 70 and the reinforcing frame 80 have open portions at their downstream ends.

The reinforcing frame 80 is connected to a carriage 96 through connecting members 97. The carriage 96 is provided with upstanding ears 98 that terminate in internally threaded sleeves 100 that engage a worm drive 102 on each side of the carriage 96. This arrangement guides the movement of the ring-like member 80 between an upstream position at shaping station 16, a downstream position in alignment with sheet transfer means 17 and an intermediate parking position just downstream of the shaping station. The carriage 96 is reinforced by several arcuate cross braces (not shown) shaped to conform with the transverse curved shape defined by the upper surfaces of the lower bar-type nozzle housings 54 and the lower ends of the rows of upper pipe nozzles 52 so as to be capable of moving therebetween.

The doughnut rolls 56 of the shaped glass sheet transfer means 17 are arranged in spaced, parallel rows. At their upper positions, the vertically movable rolls 56 have an upper common tangent in the same horizontal plane as the upper common tangent of the additional doughnut rolls 74. At their lower positions, rolls 56 are located below the path taken by ring-like member 70 and its supporting frame 80.

The worm drive 102 controls the position of the carriage 96 and its supported ring-like member 70 relative to one of the three positions of rest occupied by the ring-like member 70 during a cycle of operation. Limit switches LS-1, LS-2 and LS-3 are provided for actuation by a lug 104 attached to the carriage 96 to control different steps in a cycle of movement of the ring-like member 70 to be explained subsequently.

A CYCLE OF OPERATION

At the beginning of a shaping cycle according to the present invention, a glass sheet G is conveyed into the glass shaping station 16 on conveyor rolls 18 with the lower mold 34 disposed in a retracted position with its upward facing shaping surface entirely below the upper support surface provided by the conveyor rolls 18 and the upper vacuum mold 36 having its apertured downward facing shaping surface 38 spaced a short distance above the upper surface of the glass sheet G. The latter travels from a position between the sensing elements S for a sufficient time for it to be in the proper position of alignment between the lower mold 34 and the upper vacuum mold 36. Since the glass sheet is initially shaped to a cylindrical curve about an axis extending substantially parallel to the direction of glass sheet movement defined by the conveyor rolls 18, the exact moment that the lower mold 34 is actuated is not as critical as it would be for more complicated bends.

Figure 6:
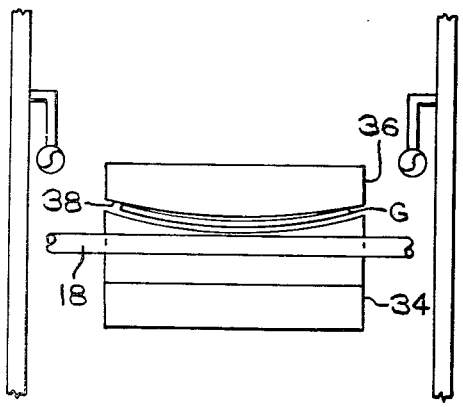
FIG. 6 is a view similar to FIGS. 4 and 5, taken immediately after FIG. 5, showing how the upper vacuum mold initially engages the glass sheet when the distance between the molds is sufficiently small to enable suction to lift the glass sheet from the lower mold.

As the glass sheet arrives at the shaping station 16, a piston 28 is extended thereby permitting lug 33 to disengage from limit switch LS-4. This causes vacuum to be applied to the upper vacuum mold 36 as the lower mold 34 is lifted. The glass sheet is shown in FIG. 5 being lifted on the lower mold 34 into a position in the vicinity of the upper vacuum mold 36. Since the glass sheet is hot when it arrives at the shaping station, it readily sags by gravity to conform to the relatively sharp curvature of the upwardly facing shaping surface of the lower mold 34 by the time it arrives in position in close adjacency to the downward facing shaping surface of the upper vacuum mold 36. Glass sheet G is lifted into close adjacency to the upper vacuum mold 36 by limiting the extent of upward movement of piston 28, and before the glass sheet is simultaneously engaged between the upward facing surface of the lower mold 34 and the downward facing shaping surface of the upper vacuum mold 36, suction lifts the shaped glass sheet G so that the peripheral portion only of the glass is initially brought into engagement with the downward facing shaping surface of the upper vacuum mold 36. The shape defined by the downward facing shaping surface of the upper vacuum mold 36 is of a shallower bend than the upward facing shaping surface of the lower mold 34. This arrangement permits the glass sheet G to be initially supported against the downward facing shaping surface of the upper vacuum mold 36 in the position depicted in FIG. 6 with the portion of the glass sheet intermediate its end portions initially out of contact with the downward facing shaping surface of the upper vacuum mold 36.

Figure 7:
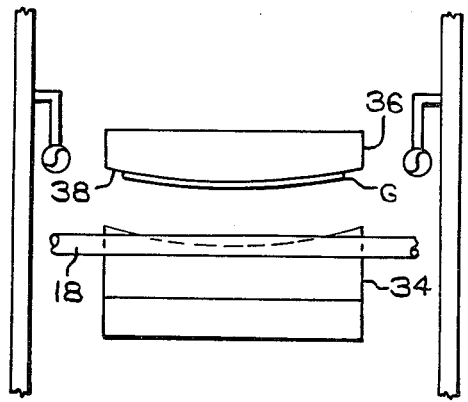
FIG. 7 is a view taken shortly after that of FIG. 6, showing how continued suction increases the area of engagement between the glass sheet and the upper vacuum mold.

Lower mold 34 has been lifted in response to the sensor S actuating a timer circuit (not shown) that extends the piston 28 on sensing the passage of the glass sheet G into the shaping station 16. Limit switch LS-4 is released by the onset of lifting of mold 34 to actuate the vacuum for the upper vacuum mold 36 as previously described, also actuates a timer that controls the onset of the return of the lower shaping mold to its recessed position. The latter timer is timed to insure that the return of the lower mold 34 by retraction of piston 28 is coordinated with the time that the glass sheet is engaged by suction against the downward facing shaping surface of the upper vacuum mold 36. The timer also initiates the upward retraction of vertical piston 43 which causes lifting of the upper vacuum mold 36 simultaneous with the downward movement of the lower mold 34. Vacuum is continued as the upper vacuum mold rises so as to cause the upper surface of the glass sheet to conform exactly to the more shallow shape of the downward facing shaping surface of the upper vacuum mold 36. This stage of the operation is depicted in FIG. 7.

Figure 8:
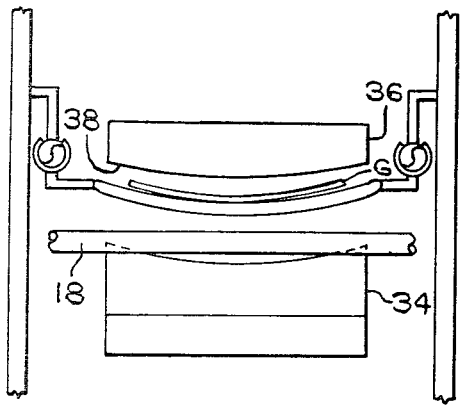
FIG. 8 is a view taken shortly after FIG. 7, showing the lower mold and upper vacuum mold separated and a ring-like member whose upper surface defines a transverse shape having a larger radius of curvature than that of the upper vacuum mold receiving the glass sheet from the upper vacuum mold, and depicting the difference in transverse shape between the glass sheet and the upper transverse curvature of the ring-like member at the moment the glass sheet makes initial contact with the ring-like member.
Figure 9:
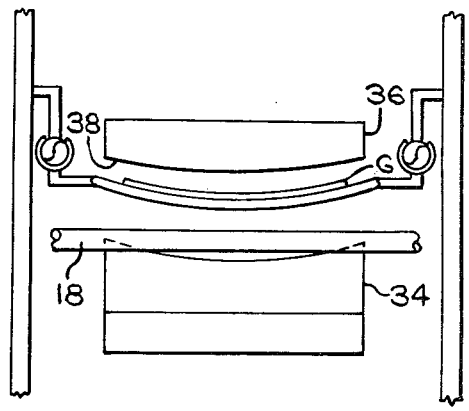
FIG. 9 is a view of the ring-like member and its supported glass sheet taken shortly after FIG. 8, showing how the glass sheet conforms to the shape of the ring-like member after a brief interval of support thereon.

When the upper vacuum mold 36 reaches the upper position depicted in FIG. 8, the shaping station is now ready to receive the ring-like member 70 into position between the upper vacuum mold 36 and the lower mold 34. When lug 104 on carriage 96 engages limit switch LS-1, the ring-like member 70 is stopped at its aforesaid upstream position directly below the upper vacuum mold 36. At the same time, when the ring-like member 70 occupies its upstream position immediately below the upper vacuum mold 36, limit switch LS-1 releases the vacuum in upper vacuum mold 36, thereby permitting the shaped glass sheet to be deposited onto the ring-like member 70. The shape of the ring-like member transverse to the path of movement, and particularly the transversely extending portion 76 of the ring-like member 70 may have the same curvature or a different curvature from that defined by the downwardly facing shaping surface of the upper vacuum mold 36. In FIG. 8, a ring-like member 70 is shown having a shaping surface that is more shallow than that defined by the upper vacuum mold 36. Under these circumstances, the glass sheet, still soft from its heating in the furnace 12, is dropped so that its center portion initially rests on the center portion of the transversely extending rail portion 76 of the ring-like member and the extremities of the glass sheet initially bent to a sharper curvature are spaced upward from the shaping rail transverse portion as depicted in FIG. 8. However, before the carriage 96 moves the glass sheet into the cooling station 14, its end portions sag to conform to the remainder of the outline configuration of the shaping rail of the ring-like member 70.

FIG. 10 is similar to FIG. 8 only showing a glass sheet G being dropped onto a ring-like member 70 whose transversely extending rail portion 76 defines a curvature of even sharper radius of bend than that defined by the downward facing shaping surface of the upper vacuum mold 36. The radius of curvature may even be sharper than that defined by the lower mold 34. Thus, when the glass sheet G is dropped on the termination of vacuum, only the side edges of the bent glass sheet will initially rest on the transversely extending rail portion 76 of the ring-like member 70 and the glass will then sag to complete its sharper shape in conformance with the upper edge of the transversely extending rail portion 76 of the ring-like member 70 as depicted in FIG. 11.

The glass sheet G supported on the ring-like member 70 is transferred to the cooling station 14 where air under pressure is applied through the downward facing nozzles 52 extending from the upper plenum chamber 51 and through the orifices of the lower bar-type nozzles 54 extending upward from the lower plenum chamber 53 to cool the glass as rapidly as possible to impart at least a partial temper thereto. When the glass sheet reaches a position above the doughnut rolls 56, the latter are raised in unison to lift the glass sheet G off the ring-like member 70 while rotating in unison in a direction that propels the glass sheet in a downstream direction onto the downstream conveyor 20.

FIG. 3 shows the cooled glass sheet G transferring from the doughnut rolls 56 of the sheet transfer means 17 in a downstream direction depicted by the arrow d while the ring-like member 70 is simultaneously beginning to return in an upstream direction depicted by the arrow u toward the intermediate parking position immediately downstream of the shaping station 16 in case the succeeding glass sheet G has not as yet been engaged by suction by the upper vacuum shaping mold 36. The ring-like member 70 may move into a parking position depicted in FIG. 2 immediately downstream of the shaping station 16 or directly into its upstream position at the shaping station 16 should the glass sheet be already supported by suction against the upper vacuum mold 36 and the lower mold 34 has moved down to a vertical position sufficiently low to provide clearance for the ring-like member 70 to move to below the vacuum mold 36 without stopping.

When the glass sheet supported on the ring-like member 70 arrives in a position above the sheet transfer means 17, the doughnut rolls 56 and their thin shafts 58 are in their downward retracted position with frame 64 being retracted downwardly by the retraction of piston rod 68 actuated by elevator means 66 while awaiting the arrival of the ring-like member 70 into position where lug 104 engages limit switch LS-2. The worm drive 102 has driven the carriage 96 and its supported ring-like member 70 part way into the sheet transfer means 17. A timer circuit actuated by lug 104 engaging limit switch LS-2 in the downstream direction has caused the elevator means 66 to raise the piston 68, thereby lifting frame 64, shafts 58 and rotating doughnut rolls 56 into intermediate positions approaching the level at which they would lift the glass sheet G off the ring-like member. This upward movement releases limit switch LS-5, thereby causing the doughnut rolls 56 to start to rotate in unison.

When the ring-like member 70 arrives at its most downstream position, lug 104 engages limit switch LS-3 to stop the worm drive 102. At this time, the rotating doughnut rolls 56 have begun to transfer the glass sheet over the ring-like member 70 toward the most upstream doughnut roll 74 of the downstream conveyor 20. The piston rod 68 remains fully extended as the glass sheet G continues to move downstream further into the downstream conveyor 20. At a proper time, a timer actuated by limit switch LS-3 controls the onset of the reverse rotation of the worm drive 102 that controls the return movement of the ring-like member 70 in an upstream direction to either the parking position or directly into the shaping station. An additional timer controlled by limit switch LS-3 causes the elevator means 66 to start to retract the piston rods 68, thereby lowering the doughnut rolls 56 and their thin shafts 58 to prepare the transfer means 17 for the next operation. If the apparatus operates rapidly enough, as indicated by the time out of a timer circuit whose time starts by a subsequent actuation of the sensing means S, the reset limit switch LS-4 permits the ring-like member 70 to move directly upstream through the parking position into the shaping station 16 without stopping at its parking position. During the time that the ring-like member 70 moves into or through the parking position controlled by the engagement of lug 104 against limit switch LS-2, lower mold 34 remains retracted below the conveyor rolls 18 to provide clearance for a succeeding glass sheet G to enter into a position of alignment between the upper vacuum mold 36 and the lower mold 34.

The shaping rail of the ring-like member 70 may be provided with longitudinally extending rail portions 77 that are curved either concavely or convexly in elevation (as depicted in FIGS. 13 and 14, respectively) or curved both ways (as seen in FIG. 15) in combination with the transverse rail portion 76 that is curved in elevation to define compound shaping surfaces. If the longitudinally extending portions 77 of the rail have an upper shaping surface that is straight as shown in FIG. 12, then the ring-like member defines a cylindrical curvature whose radius of curvature defined by the transversely extending rail portion 76 may be the same or different from that defined by the downward facing shaping surface of the upper vacuum mold 36. It is also understood that the transversely extending rail portion 76 may define a shaping surface portion whose shape is any shape desired other than cylindrical.

According to a specific embodiment of the present invention, a combination of a lower mold having an upward facing shaping surface of a relatively sharp bend, such as a 48 inch radius of curvature, has been combined with an upper vacuum mold having a downward facing shaping surface defining a cylindrical bend of 50 inch radius of curvature to provide cylindrical bends in a glass sheet by drop forming the glass sheet bent to a cylindrical radius of curvature of 50 inches onto readily replaceable ring-like members defining radii of curvature from less than 43 inches to greater than 60 inches. In addition, cylindrical bends formed by suction against the upper shaping surface have been converted into compound curvatures by drop forming the hot glass sheet from the upper vacuum mold onto ring-like members whose longitudinal shaping rail portions are shaped to conform to the shape desired for the other component of bending about an axis extending transverse to the path of movement whereas a cylindrical or other component of bend is formed about an axis of bending longitudinal to the path of movement.

It is understood that any type of complicated bend defined by the rail-like member including complicated bends having both convex and concave elements in elevation in the direction of glass sheet movement may be combined with any transverse radius of curvature within a wide range of limits.

According to a preferred embodiment of the present invention, therefore, a permanently installed lower mold 34 having an upward facing shaping surface of cylindrical configuration cooperates with a permanently installed upper vacuum mold having a downward facing shaping surface of a larger radius of curvature of cylindrical configuration in combination to form a bend having a shape conforming to that of the downward facing shaping surface of the upper vacuum mold. However, if further shaping is desired, then the shape of the ring-like member defines a different shape correlated with the ultimate shape desired for the glass sheet. Therefore, the present invention does not require any replacement of either the lower mold or the upper vacuum mold. It is only necessary to change the ring-like member whenever a change in production pattern calling for shaping a glass sheet to a different outline or a different configuration which could be either a cylindrical bend or a more complicated bend incorporating a cylindrical bend having a radius of curvature over a relatively wide range of curvatures or a non-cylindrical bend component is required.

The form of the invention shown and described in this disclosure represents an illustrative preferred embodiment and various modifications thereof. It is understood that various changes may be made in the structure and method of operation without departing from the gist of the invention except insofar as defined in the claimed subject matter that follows.

I claim:

1. In the method of shaping a heat-softened glass sheet to a shape having a bend component having a given sharpness of curvature by engaging the lower surface of said sheet with a lower mold having an upward facing shaping surface and sagging said sheet toward said upward facing shaping surface during said engagement, applying suction to the upper surface of said lifted glass sheet through an upper vacuum mold having an apertured downward facing shaping surface to remove said glass sheet from said lower mold and engage said sheet by suction, the improvement comprising engaging the lower surface of said glass sheet with said upward facing shaping surface having a relatively sharp curvature for said bend component and then applying suction through said downward facing shaping surface having a bend component of slightly more shallow curvature whereby the marginal portion only of said upper surface of said glass sheet initially engages said downward facing shaping surface and then said suction causes the entire glass sheet to conform to the shape of said downward facing shaping surface.

2. The improvement as in claim 1, wherein said suction is started during the lifting of said glass sheet before said glass sheet engages said downward facing shaping surface whereby said lifted glass sheet is transferred by suction from said upward facing shaping surface to said downward facing shaping surface when said shaping surfaces are spaced from one another a distance greater than the thickness of said glass sheet.

3. The improvement as in claim 2, further including preventing said shaping surfaces from approaching one another closer than a separation therebetween that exceeds the thickness of said glass sheet.

4. The improvement as in claim 3, wherein said shaping surfaces are prevented from approaching one another closer than a separation therebetween that approximates twice the glass sheet thickness.

5. The improvement as in claim 1 or 2 or 3 or 4, further including transferring said glass sheet from said downward facing shaping surface to a ring-like member by dropping said sheet onto said member having an upward facing shaping surface having a different sharpness of curvature for said bend component from that of said downward facing shaping surface, thereby changing the sharpness of curvature of said component of bend of said glass sheet to a desired sharpness of curvature.

6. The improvement as in claim 5, comprising transferring said glass sheet from said downwardly facing shaping surface to said ring-like member having an upward facing shaping surface having a greater sharpness of curvature for said bend component than said downward facing shaping surface, whereby said dropping changes the shape of said glass sheet to a shape having a greater sharpness of curvature.

7. The improvement as in claim 5, comprising transferring said glass sheet from said downwardly facing shaping surface to said ring-like member having an upward facing shaping surface having a lesser sharpness of curvature for said bend component than said downward facing shaping surface, whereby said dropping changes the shape of said glass sheet to a shape having a lesser sharpness of curvature.

8. The improvement as in claim 5, wherein said glass sheet is dropped onto a ring-like member having a shaping rail that defines a compound bend including components of bending about two angularly disposed axes of bending to impart a compound shape comprising components of bending about two angularly disposed axes of bending.

9. The improvement as in claim 5, comprising first engaging said glass sheet by a lower mold having an upwardly facing shaping surface that defines a cylindrical shape having a given radius of curvature, then engaging said glass sheet by an upper vacuum mold having a downwardly facing shaping surface that defines a cylindrical shape having a larger radius of curvature than said given radius, and finally transferring said glass sheet to said ring-like member having an upwardly facing shaping surface that defines a cylindrical shape having a different radius of curvature than that defined by said downwardly facing shaping surface.

10. The improvement as in claim 5, comprising first engaging said glass sheet by a lower mold having an upwardly facing shaping surface that defines a cylindrical shape having a given radius of curvature, then engaging said glass sheet by an upper vacuum mold having a downwardly facing shaping surface that defines a cylindrical shape having a larger radius of curvature than said given radius, and finally transferring said glass sheet to said ring-like member having an upwardly facing shaping surface that defines a cylindrical shape having a larger radius of curvature than that defined by said downwardly facing shaping surface.

11. The improvement as in claim 5, comprising first engaging said glass sheet by a lower mold having an upwardly facing shaping surface that defines a cylindrical shape having a given radius of curvature, then engaging said glass sheet by an upper vacuum mold having a downwardly facing shaping surface that defines a cylindrical shape having a larger radius of curvature than said given radius, and finally transferring said glass sheet to said ring-like member having an upwardly facing shaping surface that defines a cylindrical shape having a smaller radius of curvature than that defined by said downwardly facing shaping surface.

12. The improvement as in claim 5, comprising first engaging said glass sheet by a lower mold having an upwardly facing shaping surface that defines a cylindrical shape having a given radius of curvature, then engaging said glass sheet by an upper vacuum mold having a downwardly facing shaping surface that defines a cylindrical shape having a larger radius of curvature than said given radius, and finally transferring said glass sheet to said ring-like member having an upwardly facing shaping surface that defines a compound bend to develop a compound bend in said glass sheet.

13. Apparatus for shaping a glass sheet comprising a lower mold having an upward facing shaping surface defining a shape having a given sharpness of curvature, an upper vacuum mold having a downward facing, apertured shaping surface defining a shape having a sharpness of curvature less than that of said given curvature, means adapted to apply suction to said vacuum mold, means to move at least one of said molds between a spaced apart relation therebetween and a closely spaced relation therebetween, whereby a heat-softened glass sheet supported by said upward facing shaping surface sags to conform to said upward facing shaping surface while said molds are in a spaced apart relation, is transferred by suction so that its peripheral portion only engages said downward facing shaping surface initially when said molds occupy positions approaching said closely spaced relation therebetween and additional suction causes the upper surface of said glass sheet to increase its area of contact with said downwardly facing shaping surface inward of its perimeter to conform to the shape of said downward facing shaping surface.

14. Apparatus as in claim 13, further including a ring-like member having an upward facing shaping surface defining a shape having a sharpness of curvature different from that of said downwardly facing shaping surface, means to deliver said ring-like member to a position between said lower mold and said upper vacuum mold to enable said upper vacuum mold to transfer said glass sheet from engagement with said downwardly facing shaping surface to said ring-like member on releasing vacuum from said upper vacuum mold, whereby said glass sheet develops a shape correlated with that of the upwardly facing shaping surface of said ring-like member.

15. Apparatus as in claim 14, wherein said upward facing shaping surface of said ring-like member defines a shape that has a sharper curvature than that of said upper vacuum mold.

16. Apparatus as in claim 14, wherein said upward facing shaping surface of said ring-like member defines a shape that has a shallower curvature than that of said upper vacuum mold.

17. Apparatus for shaping a glass sheet comprising a lower mold having an upwardly facing shaping surface of cylindrical curvature having a given radius of curvature about a given axis of bending and an upper vacuum mold having a downwardly facing shaping surface of cylindrical curvature having a larger radius of curvature about an axis parallel to said given axis than said given radius.

18. Apparatus as in claim 17, further including means to change the distance between said molds, a ring-like member having a shaping rail portion defining a cylindrical bend about an axis parallel to said given axis and having a different radius of curvature from that of said downwardly facing shaping surface, and means to move said ring-like member to a position between said molds when the latter are separated.

19. Apparatus as in claim 17, further including means to change the distance between said molds, a ring-like member having a shaping rail portion defining a cylindrical bend about an axis parallel to said given axis and having a larger radius of curvature than that of said downwardly facing shaping surface, and means to move said ring-like member to a position between said molds when the latter are separated.

20. Apparatus as in claim 17, further including means to change the distance between said molds, a ring-like member having a shaping rail portion defining a cylindrical bend about an axis parallel to said given axis and having a smaller radius of curvature than that of said downwardly facing shaping surface, and means to move said ring-like member to a position between said molds when the latter are separated.

21. Apparatus as in claim 18 or 19 or 20 wherein said ring-like member has a shaping rail portion extending transverse to said first shaping rail portion that is curved about an axis of bending transverse to said given axis.

* * * * *

UNITED STATES PATENT AND TRADEMARK OFFICE
CERTIFICATE OF CORRECTION

PATENT NO. : 4,252,552

DATED : February 24, 1981

INVENTOR(S) : Robert G. Frank

It is certified that error appears in the above-identified patent and that said Letters Patent are hereby corrected as shown below:

Column 1, line 25, "the" third occurrence should be -- to --.

Column 5, line 48, "and" should be --of--.

Column 7, line 60, "appeared" should be --apertured--.

Column 9, line 51, "aother" should be --another--.

Column 11, line 14, "80" should be --70--.

Signed and Sealed this

Sixteenth Day of June 1981

[SEAL]

Attest:

RENE D. TEGTMEYER

Attesting Officer     Acting Commissioner of Patents and Trademarks